United States Patent
O'Briant

(10) Patent No.: US 8,171,729 B2
(45) Date of Patent: May 8, 2012

(54) MECHANICAL OUTPUT WORK GENERATING APPARATUS INCORPORATING BUOYANCY INDUCING COMPONENTS

(76) Inventor: Robert E. O'Briant, Flint, MI (US)

(*) Notice: Subject to any disclaimer, the term of this patent is extended or adjusted under 35 U.S.C. 154(b) by 328 days.

(21) Appl. No.: 12/476,354

(22) Filed: Jun. 2, 2009

(65) Prior Publication Data

US 2009/0309373 A1  Dec. 17, 2009

Related U.S. Application Data

(60) Provisional application No. 61/061,278, filed on Jun. 13, 2008.

(51) Int. Cl.
- *F03B 17/02* (2006.01)
- *F03G 7/08* (2006.01)
- *F03D 11/04* (2006.01)

(52) U.S. Cl. ............ 60/495; 60/496; 290/1 R; 415/7

(58) Field of Classification Search .......... 60/495, 60/496; 290/1 R; 415/5, 7
See application file for complete search history.

(56) References Cited

U.S. PATENT DOCUMENTS

| | | | |
|---|---|---|---|
| 2,037,973 A * | 4/1936 | Grondahl | 60/496 |
| 3,857,242 A * | 12/1974 | Gilmore | 60/495 |
| 3,927,330 A | 12/1975 | Skorupinski | |
| 4,054,031 A | 10/1977 | Johnson | |
| 4,084,375 A | 4/1978 | Horvath | |
| 4,207,741 A | 6/1980 | Rainey | |
| 4,246,756 A * | 1/1981 | West | 60/640 |
| 4,254,622 A * | 3/1981 | Denson, Sr. | 60/496 |
| 4,267,695 A | 5/1981 | Micciche | |
| 4,324,099 A | 4/1982 | Palomer | |
| 4,718,232 A | 1/1988 | Willmouth | |
| 4,726,188 A | 2/1988 | Woolfolk | |
| 4,742,242 A | 5/1988 | De Shon | |
| 4,838,025 A | 6/1989 | Nelis | |
| 4,981,015 A | 1/1991 | Simpson | |
| 5,458,250 A | 10/1995 | Martinez | |
| 5,464,320 A | 11/1995 | Finney | |
| 5,685,147 A | 11/1997 | Brassea | |
| 5,944,480 A * | 8/1999 | Forrest | 415/5 |
| 6,009,707 A | 1/2000 | Alkhamis | |
| 6,139,255 A | 10/2000 | Vauthier | |
| 6,249,057 B1 * | 6/2001 | Lehet | 290/1 R |
| 6,269,638 B1 * | 8/2001 | Murata | 60/496 |
| 6,305,165 B1 | 10/2001 | Mizuki, Sr. | |
| 6,546,726 B1 | 4/2003 | Tomoiu | |
| 6,734,574 B2 | 5/2004 | Shin | |

(Continued)

FOREIGN PATENT DOCUMENTS

JP  08200205 A  8/1996

*Primary Examiner* — Thomas Denion
*Assistant Examiner* — Christopher Jetton
(74) *Attorney, Agent, or Firm* — Gifford, Krass, Sprinkle, Anderson & Citkowski, P.C.

(57) ABSTRACT

A mechanical output generating assembly including housing having a fluid filled interior and defining a passageway through which travels a buoyant article. A reload mechanism is secured to the housing for successively introducing a plurality of buoyant article into a bottom feed location associated with the housing. The buoyant articles exert a lift generating force to drive a power take off component incorporated into the housing. A re-supply mechanism is provided for transferring buoyant articles from an upper exit location of the housing to the reload mechanism for subsequent re-introduction into the housing.

11 Claims, 14 Drawing Sheets

U.S. PATENT DOCUMENTS

| | | |
|---|---|---|
| 6,769,253 B1 | 8/2004 | Scharfenberg |
| 6,803,670 B2 | 10/2004 | Peloquin |
| 6,858,950 B1 | 2/2005 | Simon |
| 6,933,624 B2 | 8/2005 | Beaston |
| 6,981,373 B2 | 1/2006 | Robinson |
| 6,990,809 B2 | 1/2006 | Abouraphael |
| 7,134,283 B2 | 11/2006 | Villalobos |
| 7,159,396 B2 | 1/2007 | Ebihara |
| 7,213,398 B2 | 5/2007 | Takeuchi |
| 7,216,483 B2 | 5/2007 | Takeuchi |
| 7,258,532 B2 | 8/2007 | Welch, Jr. et al. |
| 7,291,936 B1 | 11/2007 | Robson |
| 7,293,960 B2 | 11/2007 | Yamamoto et al. |
| 7,331,215 B2 | 2/2008 | Bond |
| 2004/0093863 A1 | 5/2004 | Huang |
| 2005/0206168 A1 | 9/2005 | Murakami et al. |
| 2006/0156718 A1 | 7/2006 | Petkovic |

\* cited by examiner

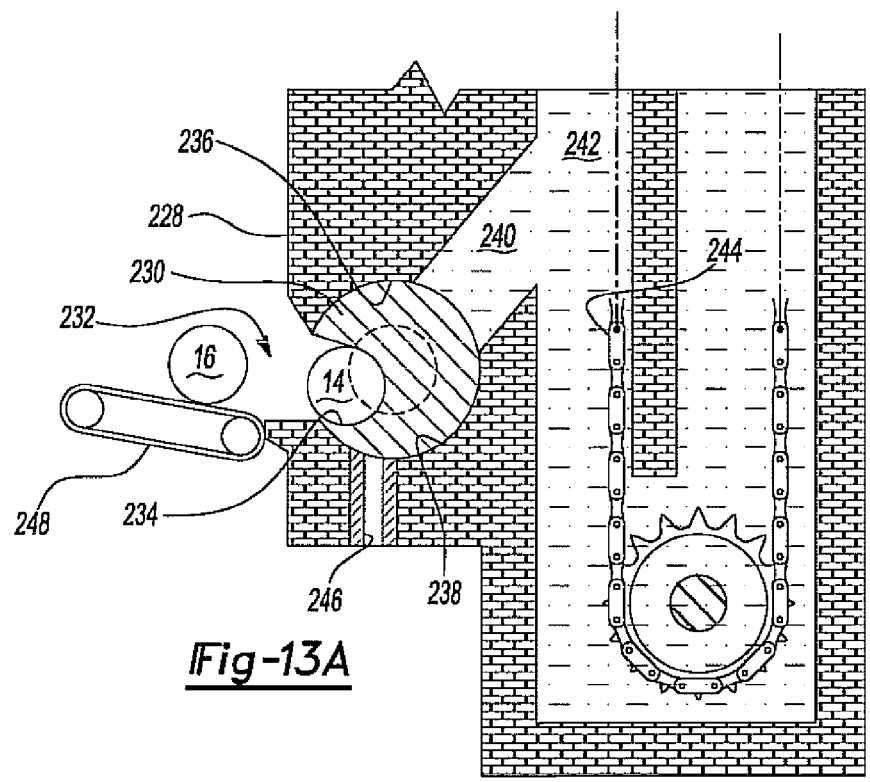
Fig-13A
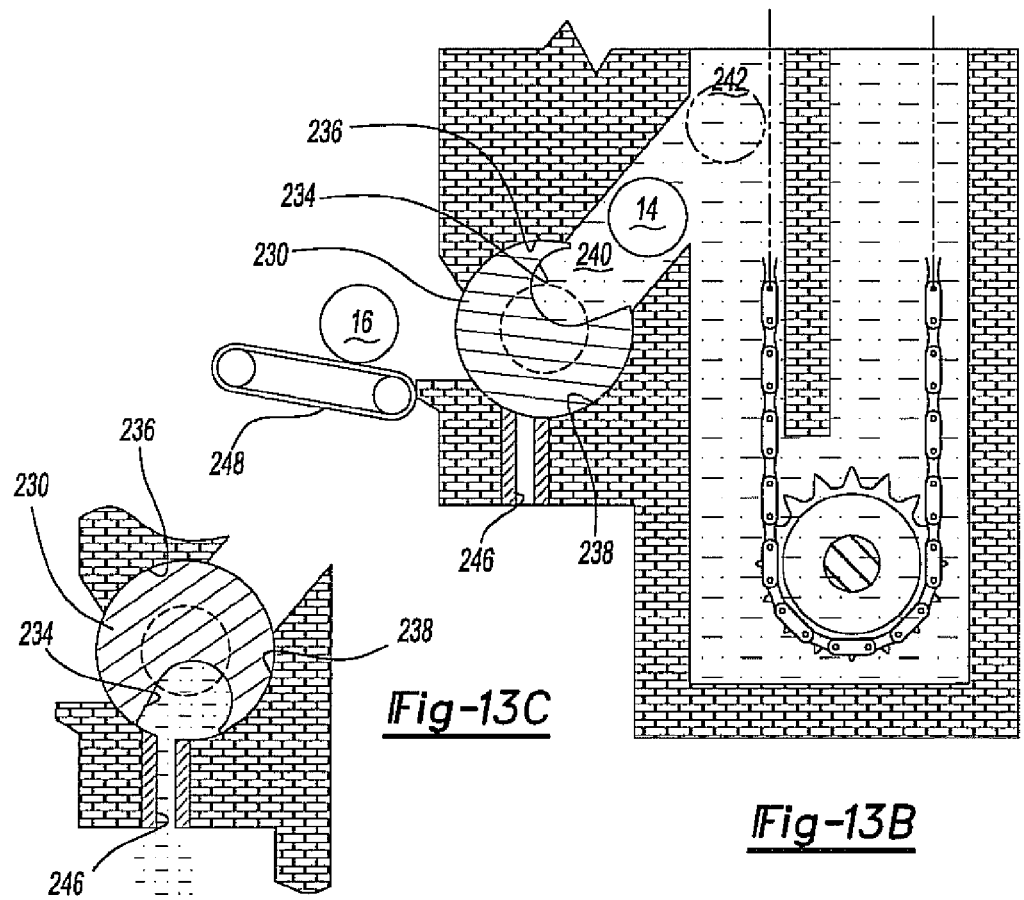
Fig-13C
Fig-13B

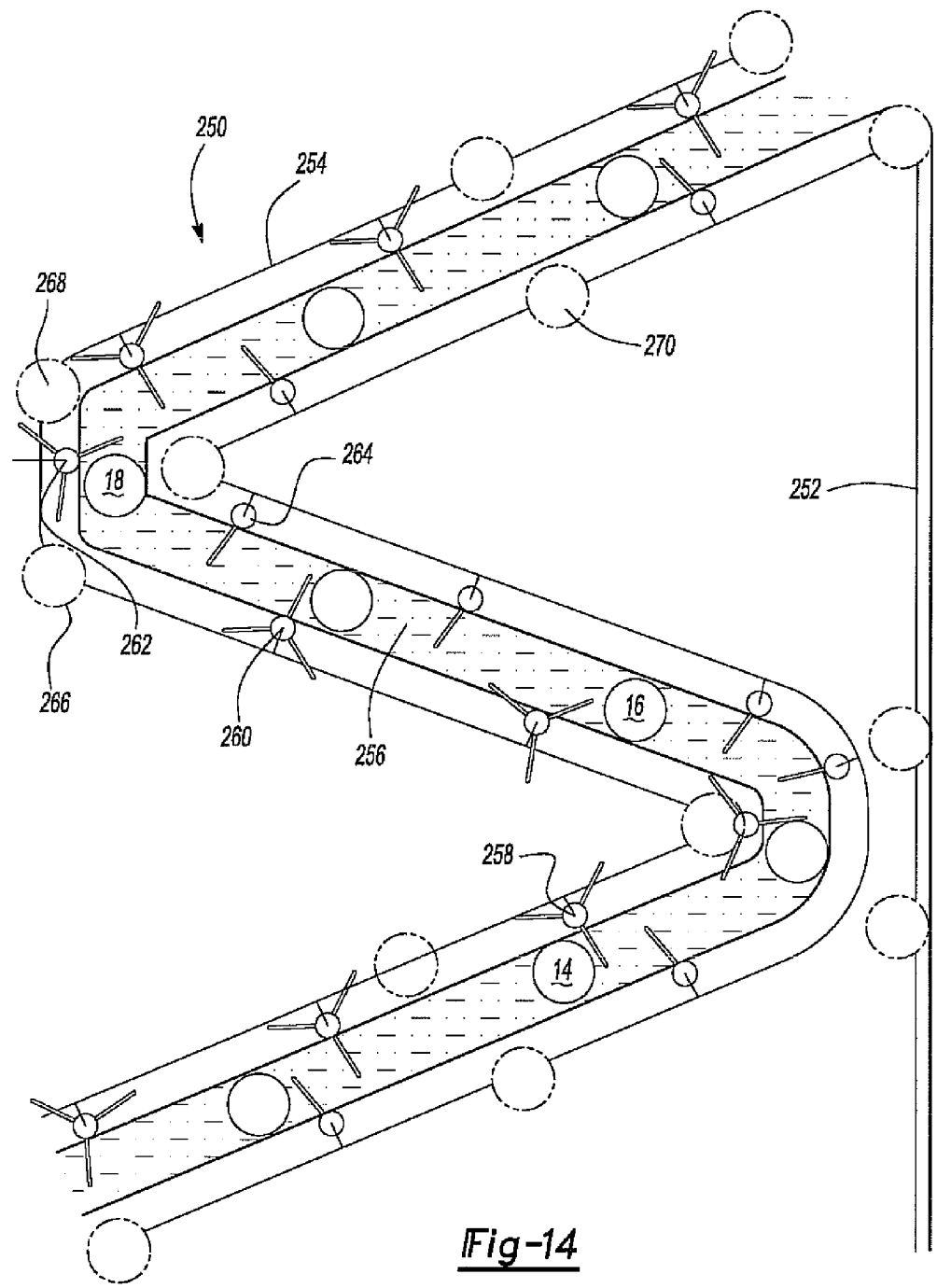

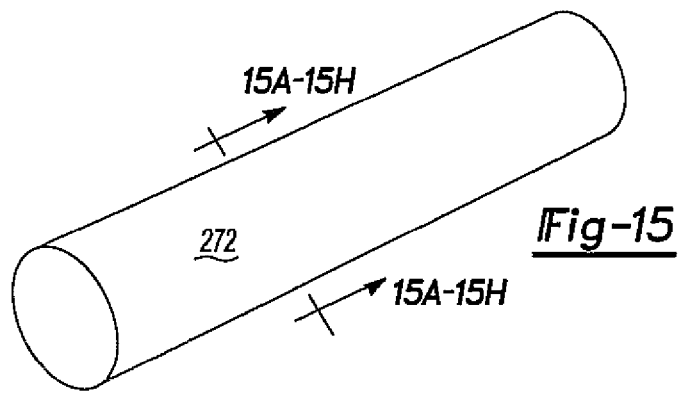
*Fig-15*
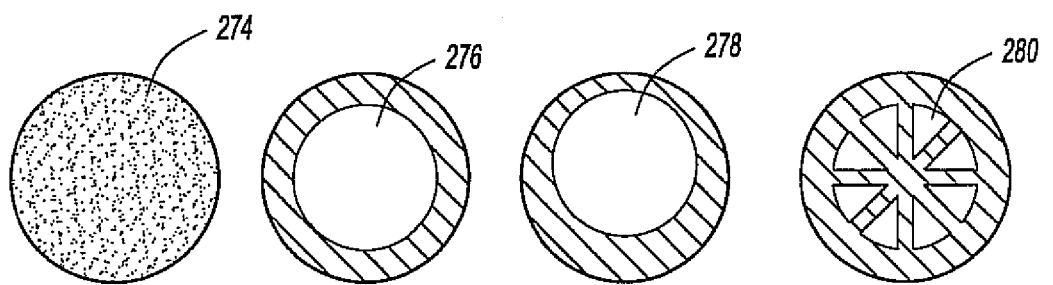
*Fig-15A*  *Fig-15B*  *Fig-15C*  *Fig-15D*
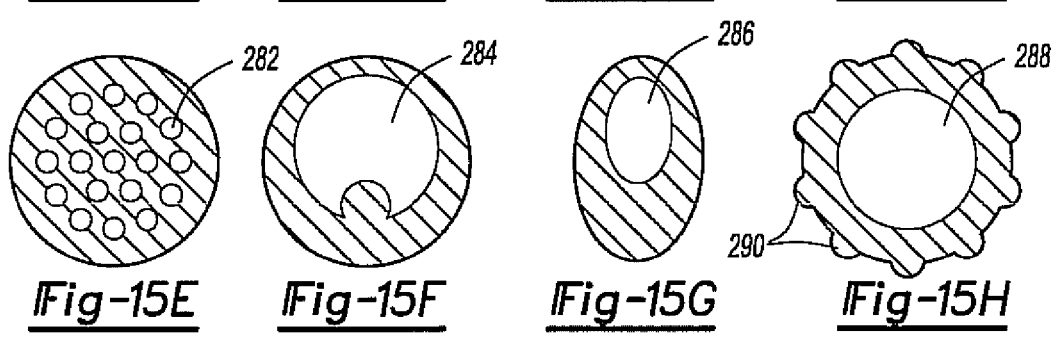
*Fig-15E*  *Fig-15F*  *Fig-15G*  *Fig-15H*
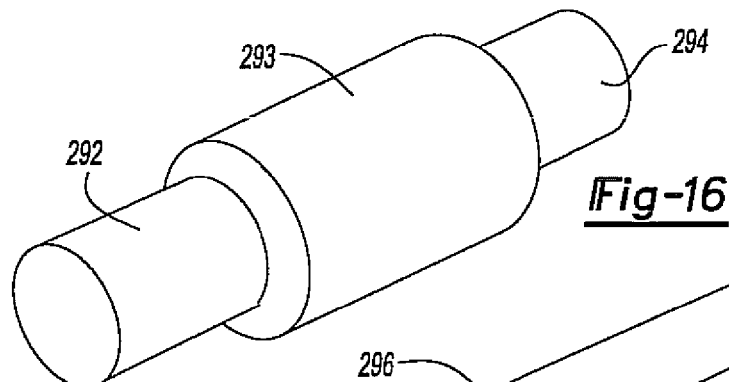
*Fig-16*
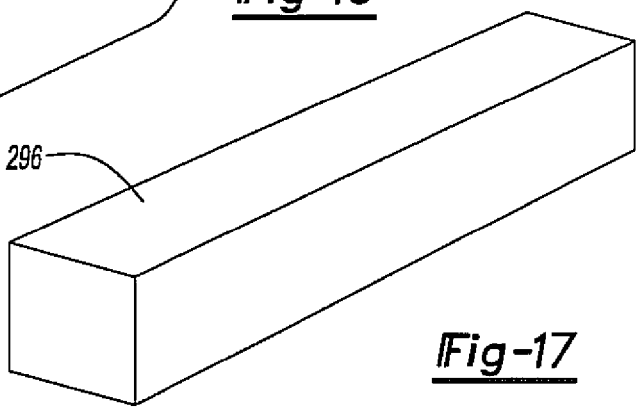
*Fig-17*

MECHANICAL OUTPUT WORK GENERATING APPARATUS INCORPORATING BUOYANCY INDUCING COMPONENTS

CROSS-REFERENCE TO RELATED APPLICATIONS

This Application claims the benefit of U.S. Provisional Application 61/061,278 filed on Jun. 13, 2008.

FIELD OF THE INVENTION

The present invention discloses a series of land, water, fixed or mobile based systems for employing density variances between a plurality of objects (exhibiting any of a number of varying forms) and a surrounding fluid or air media, and which are employed in a continuous rotating belt or chain drive assembly. More specifically, a series work generating applications are disclosed herein, all operating on the principle of exploiting the natural laws of physics relating to such density variances, and in order to provide an electricity or work based output. As will be disclosed in more detailed fashion in the description of each of the illustrated embodiments, the present inventions illustrate various attendant structures, including such as tensioner elements, dual power take off flywheel/generators and electrical generators. The present inventions further disclose improved receiver/loading stations for introducing (loading and flooding) a succession of buoyant lift cylinders, such as at a bottom location of a fluid column, and in order to establish a more continuous generating work output resulting from the rising of the lighter density cylinders within the heavier density fluid columns. Additional variants may include alternate land or fluid based columns, within which the density variant elements are buoyantly translated, as well as employing a rotating screw component in substitution for a linearly translating and closed loop conveyor arrangement.

BACKGROUND OF THE INVENTION

The prior art is well documented with examples of hydrodynamic energy conversion apparatuses, the objective of which is to harness the energy resulting from buoyant objects acting within a fluid medium of differing density. An example of such a hydrodynamic energy conversion apparatus is set forth in U.S. Pat. No. 6,249,057, issued to Lehet, and which discloses a housing with a first chamber partially filled with water to a first level and in fluid communication with a second chamber likewise filled with water to a second level. The first chamber is pressurized to a different degree relative to the second chamber and so that water is forced from the first to the second chamber. A gravity drive chain is disposed within the first chamber releasably secures a first plurality of containers for generating a first quantity of energy. Buoyancy drive means is disposed within the second chamber for releasably securing a second plurality of energy. A first transporting means transports the plurality of containers from the first from the first chamber to the second chamber when the containers are released from the gravity drive chain. An external drive shaft is coupled to the gravity drive shaft and the buoyancy drive system.

Other noteworthy buoyancy driving mechanisms include those listed in each of De Shon U.S. Pat. No. 4,742,242, Shin U.S. Pat. No. 6,734,574, Willmouth U.S. Pat. No. 4,718,232, Forrest U.S. Pat. No. 5,944,480, Micciche U.S. Pat. No. 4,267,695 and Takeuchi U.S. Pat. No. 7,216,483. Beyond those identified, additional prior art references are known which utilize or otherwise harness the buoyancy driving action of individual bodies traveling within a fluid medium of varying density.

SUMMARY OF THE INVENTION

The present invention discloses a series work generating applications in order to provide an electricity or work based output resulting from the turning or other manipulating motion of a power takeoff shaft. As will be disclosed in more detailed fashion in the description of each of the illustrated embodiments, the present inventions illustrate various attendant structures, including such as tensioner elements, dual power take off flywheel/generators and electrical generators.

In a most simplified embodiment, a mechanical output generating assembly includes a housing having a fluid filled interior and defining a passageway through which travels a buoyant article. A reload mechanism is secured to the housing for successively introducing a plurality of buoyant article into a bottom feed location associated with the housing. The buoyant articles exert a lift generating force to drive a power take off component incorporated into the housing. A re-supply mechanism is provided for transferring buoyant articles from an upper exit location of the housing to the reload mechanism for subsequent re-introduction into the housing.

The present inventions further disclose improved receiver/loading stations for introducing (loading and flooding) a succession of buoyant lift cylinders, such as at a bottom location of a fluid column, and in order to establish a more continuous generating work output resulting from the rising of the lighter density cylinders within the heavier density fluid columns and accomplishing the same without the attendant loss of excessive amounts of fluid from within the medium reservoir. Additional variants may include alternate land or fluid based columns, within which the density variant elements are buoyantly translated, as well as employing a rotating screw component in substitution for a linearly translating and closed loop conveyor arrangement.

BRIEF DESCRIPTION OF THE DRAWINGS

Reference will now be made to the attached drawings, when read in combination with the following detailed description, wherein like reference numerals refer to like parts throughout the several views, and in which:

FIG. 13A is a first sectional cutaway of a bottom end reload mechanism according to a further variant and illustrating a generally cylindrical shaped and continuous rotating member supported in substantially sealing fashion relative to an entranceway location associated with the fluid filled column, the rotating member exhibiting a three dimensional channel recess within which is received a buoyant cylinder in a first loading position;

FIG. 13B is a succeeding illustration to FIG. 13A and showing the cylindrical shaped member rotated to a position in which the cylinder receiving recess is aligned with the entranceway location for releasing the cylinder;

FIG. 13C is a further succeeding illustration in which the cylindrical member is rotated to a further position in which the fluid retaining recess is positioned in a downward and aligned fashion with a bottom extending passageway for permitting gravity discharge of fluid from the recess and prior to returning to the reloading configuration of FIG. 13A;

FIG. 14 is a lengthwise cutaway illustration of a variable angle rise chamber associated with a continuous work output assembly according to a further embodiment and illustrating one or more work output chain drives which are progressively advanced by the rotation of passageway communicating and successively positioned paddle drive members;

FIG. 15 is an illustration of a buoyant drive cylinder according to one non-limiting embodiment of the present inventions;

FIGS. 15A-15H illustrate a series of potential cutaway illustrations of the drive cylinder of FIG. 15 and which vary its buoyancy characteristics;

FIG. 16 is an illustration of a modified buoyant drive cylinder according to a further non-limiting embodiment and which illustrates opposite end extending and reduced diameter trunnion portions; and FIG. 17 is an illustration of a generally three dimensional buoyant drive mechanism according to a further non-limiting embodiment.

DETAILED DESCRIPTION OF THE PREFERRED EMBODIMENTS

As will be more completely described with reference to each of the following several preferred embodiments, the present invention discloses a series of land, water, fixed or mobile based systems for employing density variances between a plurality of objects (exhibiting any of a number of varying forms) and a surrounding fluid or air media, and which are employed in a continuous rotating belt or chain drive assembly. As also previously discussed, a series work generating applications are disclosed herein, all operating on the principle of exploiting the natural laws of physics relating to such density variances, and in order to provide an electricity or work based output.

Assisting structure such as tensioner elements, dual power take off flywheel/generators and electrical generators are provided for utilizing the work output created by the buoyancy generating structures disclosed, these capable of being constructed of a generally smaller, more portable size in order to achieve a wider range of applications not limited to land supported or sea based uses, but also including more portable self-contained units capable of achieving a continuous work output or propulsion for such as maritime (ship) or even large land-based axle driven vehicles. Along these lines, the present inventions further disclose improved receiver/loading station designs for introducing (loading and flooding) a succession of buoyant lift cylinders, these such as further including improved bottom located entry or admittance door or compartment designs associated with a buoyancy generating fluid column, and in order to establish a consistent generating work output, such as again resulting from the rising of the lighter density cylinders within the heavier density fluid columns.

Additional variants may include alternate land or fluid based columns, within which the density variant elements are buoyantly translated, as well as employing a rotating screw component in substitution for a linearly translating and closed loop conveyor arrangement. It is also envisioned and understood that the fluid columns disclosed herein can be located within such as previously excavated and/or abandoned holes (e.g. such as wells or strip mine shafts) and which are converted for use as a continuous output work engine through the installation of drive components selected from those described in the several embodiments. A primary benefit of the present inventions is the ability to generate mechanical (or mechanical to electrically generated) work without the need for fossil or nuclear based fuels, these contributing to such as pollution and global warming.

Figure 1:
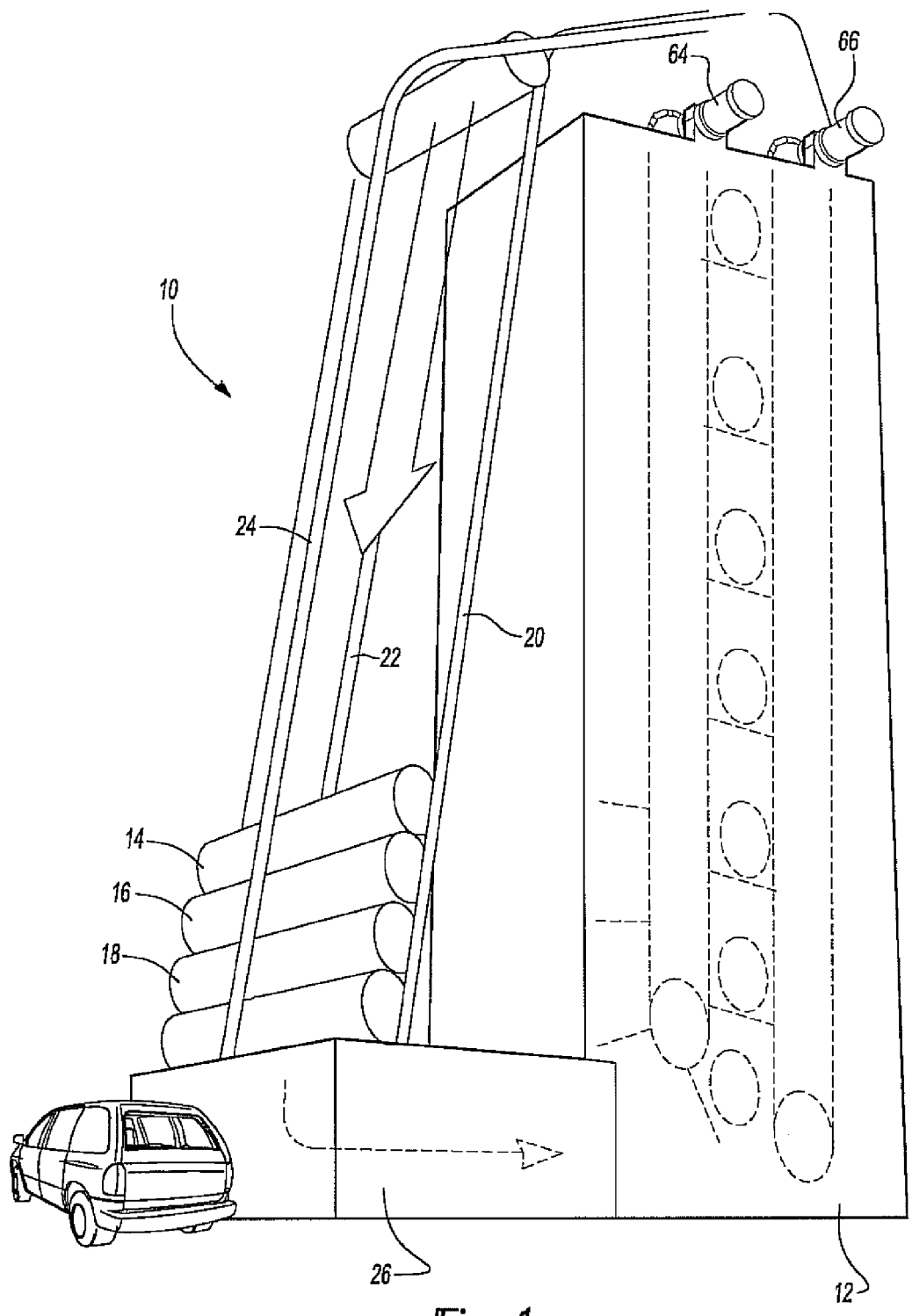
FIG. 1 is an environmental perspective of a continuous work output generating assembly according to a first embodiment of the present inventions and which illustrates a fluid containing column combined with a continuous discharge and reload mechanisms and top end located power take off shafts.
Figure 2:
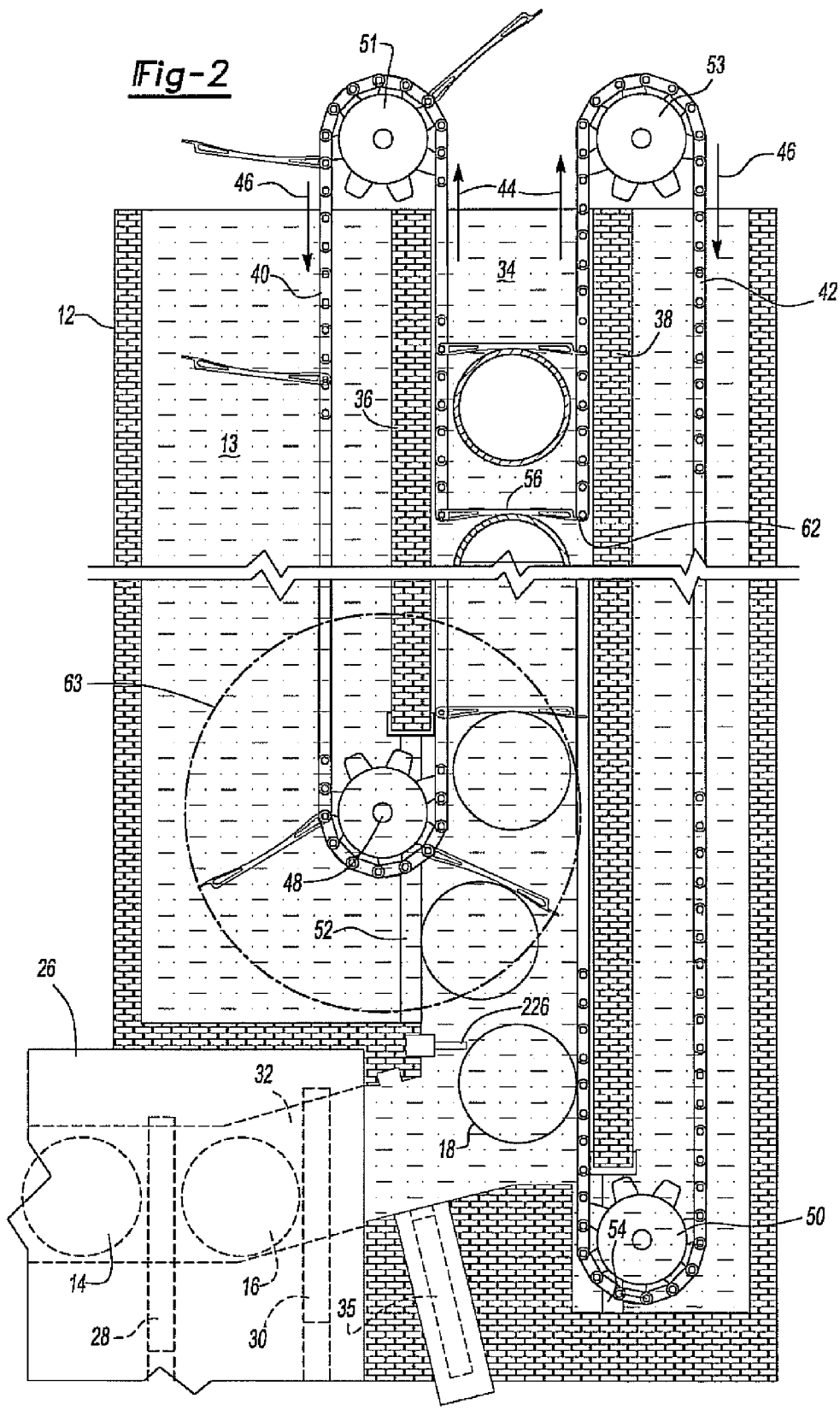
FIG. 2 is a linear cutaway of the work generating engine of FIG. 1, illustrating the column portion in reduced length, and further showing the combination of the bottom reload subassembly and the pair of spaced apart and regulating chain drives incorporated into the column for facilitating controlled upward ascension of the successively introduced buoyant cylinders.
Figure 3:
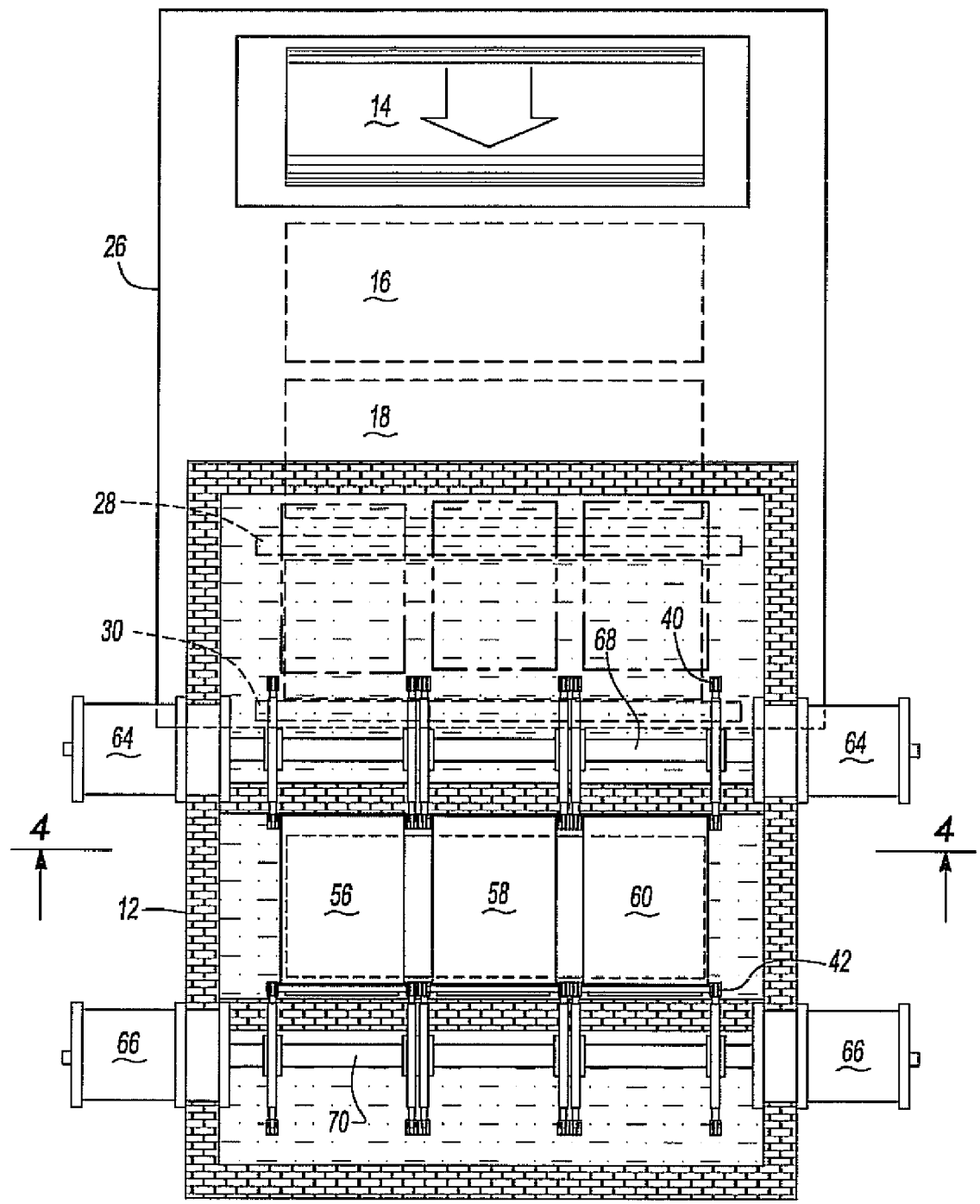
FIG. 3 is a top plan illustration of FIG. 2 and better illustrating the dimensional aspects of the chain drives including the provision of individual pluralities of widthwise positioned paddles supported between the chain drives for controlling the rise and resultant work output resulting from the buoyant cylinders.
Figure 4:
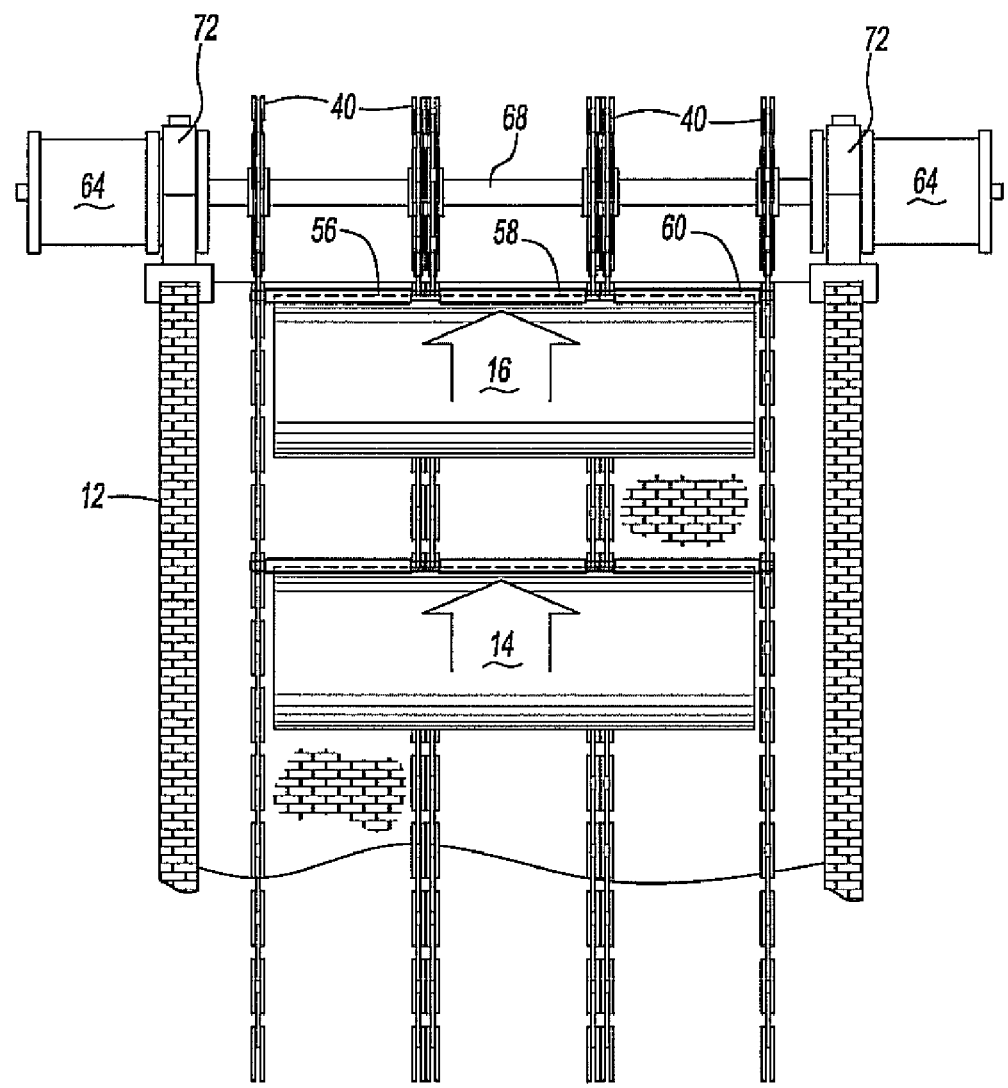
FIG. 4 is a cutaway view taken along line 4-4 of FIG. 3 and further showing in cross section the chain configuration associated with a selected chain drive.

Referring now to FIG. 1, as well as succeeding views FIGS. 2-4, an environmental perspective is generally shown at 10 of a continuous work output generating assembly according to a first embodiment of the present inventions. The assembly 10 illustrates a fluid containing column which is illustrated in FIG. 1 by a generally elongate, vertical extending and rectangular shaped housing 12 which is filled a fluid medium (see as generally shown at 13 in FIG. 2) such as most notably water. As further shown in FIG. 1, a plurality of buoyancy creating objects, such as shown at 14, 16, 18, et seq., upon existing an upper end location of the housing 12 are successively reloaded, via such as a return mechanism see guide rails 20, 22 and 24 and which are intended to generally represent any desired conveyor like structure for returning in a controlled fashion the successively elevated and removed objects. As further shown, the return rails 20-24 extend from a top end of the housing 12 in communication with a bottom end situated reload mechanism, see as further generally shown at 26.

FIG. 2 is a linear cutaway of the work generating engine of FIG. 1 and further illustrates the vertically extending column portion of the overall housing 12 in reduced length, and further shows the combination of the bottom reload subassembly mechanism, in phantom as again identified at 26. As will be further described in additional detail in reference to FIGS. 12A-12F, the reload mechanism includes, most broadly, first and second spaced apart and selectively opened gates 28 and 30, these defining a reload chamber 32 there between for successively receiving a selected buoyant canister 14, 16, 18, et seq., flooding the chamber 32, and then opening the second gate 30 to thereby permit the selected buoyant canister (see in particular as shown at 18 in FIG. 2) to be released into an entranceway associated with a specified vertical extending passageway, see at 34 defined within the housing. A further service gate (or door) is shown at 35 in FIG. 2, forming a part of the main housing structure, and which closes off the entranceway into the ascending passageway 34, such as when it is desired to disengage the removable reload mechanism 26 for servicing or repair.

As further best shown in FIG. 2, the interior cutaway of the housing includes interior, vertically extending and spaced apart support walls 36 and 38, about which are incorporated a pair of first 40 and second 42 coordinating and closed loop chain drives, these further including upward extending sides corresponding to opposing facing locations within the vertically ascending passageway 34, as well as downward extending return sides (see upward arrows 44 and downward return arrows 46). Each of the chain drives 40 and 42 are supported at a lower end by first stationary supported and rotatable gears, see at 48 and 50, respectively, and which are positioned at open locations through the interior support walls 36 and 38 within the column housing such as established by reduced dimension support columns, see further at 52 and 54. Additional gears 51 and 53 are located at a top of the housing 12 and, along with the lower gears 48 and 50, support the chain drives 40 and 42 for vertical translating (driven) motion in the manner illustrated. The arrangement of the supporting walls 36 and 38 is further such that the ascending sides of the chain drives 40 and 42 are prevented from bowing as a result of the buoyancy forces exerted thereupon by the ascending cylinders.

In use, the pair of spaced apart and regulating chain drives 40 and 42 incorporated into the column 12 facilitate controlled upward ascension of the successively introduced buoyant canisters, which are illustrated as cylinders 14, 16, 18, et. seq. however which, as will be subsequently described, can be substituted by other differently configured three dimensional objects exhibiting the features of a seal-tight integrity and modifiable buoyancy influencing characteristics. As further shown in FIG. 3, with is a top plan illustration of FIG. 2, the dimensional aspects of the chain drives 40 and 42 are such that they include the provision of individual pluralities of widthwise positioned paddles, see as representatively shown by selected set of widthwise spaced paddles 56, 58 and 60, and which as further illustrated are supported in individual pluralities defined at spaced locations along the first chain drive 40.

As further shown in FIG. 2, the extending finger portions of each paddle, see as representatively shown by finger 62 of paddle 56, is rotated into abutting engagement with a co-ascending location of the second chain drive 42 to conjoin said chain drives and so that that the buoyant inducing forces exerted by each cylinder 14, 16, 18, et seq. are transferred to the chain drives 40 and 42, for subsequent delivery to top end located power take off shafts (see further at 64 and 66 in FIG. 1) and which, as previously described, communicate with external mechanical/electrical work output mechanisms for harness the energy generated through the buoyant ascension of the cylinders. As referenced in FIG. 2, a diameter of sweep associated with paddles (see as generally referenced by perimeter defined at 63) is defined about selected lower gear 48 and such that the interior architecture of the housing 12 permits the paddles to achieve a desired clearance between the return and ascending sides of the chain drives. As further shown in FIGS. 3 and 4, the power take off shafts 64 and 66 can be provided as opposite end supported pairs which are rotated by upper end located drive shafts 68 and 70.

FIG. 4 is a cutaway view taken along line 4-4 of FIG. 3 and further showing in a cross sectional and width defining fashion the selected configuration of the first set of chain drives 40 arranged along interior support locations associated with a width of the housing 12. Also illustrated in FIG. 4 are upper end located rotating supports 72 through which extends the shafts 68 and 70 for rotatably driving the outer positioned power take off shafts 64 and 66.

Figure 5:
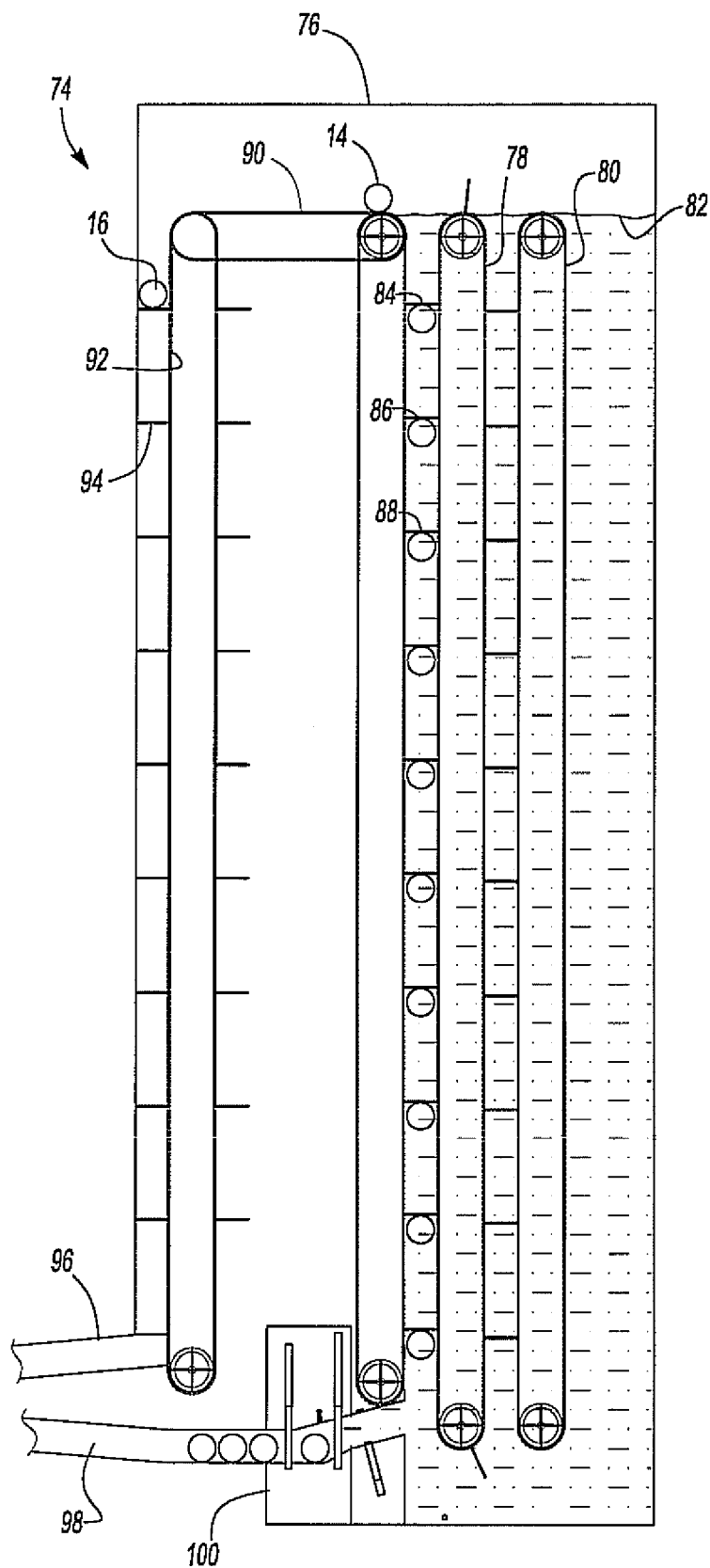
FIG. 5 is a cutaway view of a continuous work output generating assembly according to a second embodiment in which a return conveyor is incorporated into a common housing holding the fluid filled drive conveyors.

Referring now to FIG. 5, is a cutaway view is generally shown at 74 in overall schematic fashion and again includes illustrates a housing 76 associated with a continuous work output generating assembly according to a second embodiment. As most generally shown, first 78 and second 80 drive conveyors are secured by associated pairs of gears located at upper and lower ends within a fluid filled interior of the housing 76 (see fluid level 82). At least a first of the conveyors 78 includes a plurality of spaced apart support paddles 84, 86, 88 et seq. (these again being provided in individual or multiple fashion along each chain drive location). Power take off shafts are not illustrated but are again understood to be associated with such as the upper end located belt supporting gears in similar fashion as shown in reference to the embodiment of FIG. 1.

A return conveyor is incorporated into the common housing 76 also incorporating the fluid filled drive conveyors and includes a first top end located and horizontally directed exit conveyor 90 in communication with the drive conveyor 78 at a fluid surface location of the housing interior. A further and vertically descending return conveyor 92 is located in communication with the upper end exist conveyor 90 which include a plurality of spaced apart supports 94 upon which are successively deposited buoyancy canisters (see as shown at 16) for controlled descent and re-delivery to a lower end exit ramp (see as generally represented at 96) and transfer to a restocking magazine or similar reloading/reorienting structure (not shown) prior to subsequent transfer, such as along inlet conveyor 98 to a reload mechanism 100 of a type similar to that previously illustrated and described at 26 in FIGS. 1 and 2.

Figure 6:
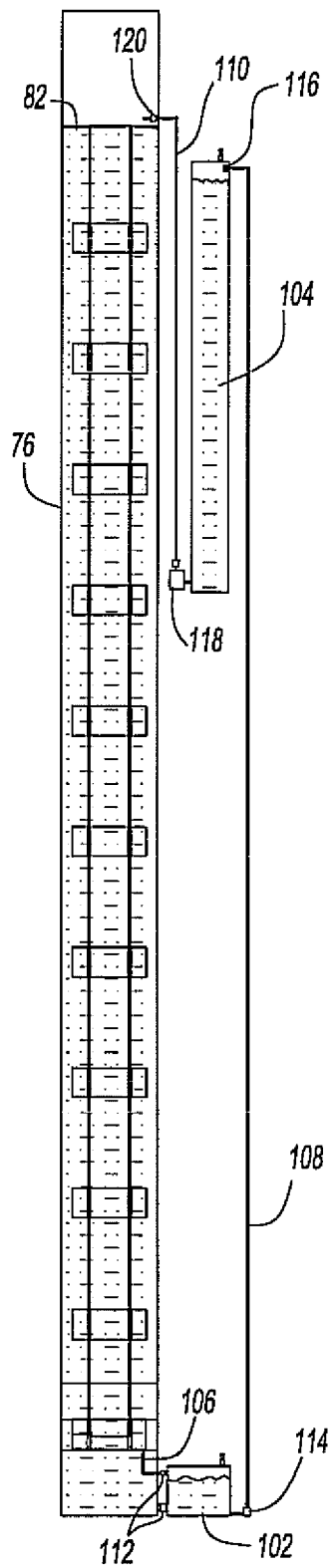
FIG. 6 is a side view of the assembly shown in FIG. 5 and further illustrating secondary and interconnected tertiary fluid filed reservoirs communicating with a primary fluid reservoir incorporating the conveyors and which employs known properties of fluid transfer physics for re-supplying to the primary reservoir fluid lost during bottom loading of buoyant cylinders.

FIG. 6 is a side view of the main housing assembly shown in FIG. 5, and further illustrating a secondary 102 and interconnected tertiary 104 fluid filled reservoirs communicating with the primary fluid reservoir previously identified at 76. Interconnecting fluid conveying conduits include such as shown at 106 extending between a bottom end outlet of the main reservoir 76 (and in particular a location associated with the reload mechanism 100 in which a minor volume of fluid loss occurs the reload of each succeeding canister and for which successive replenishment of fluid is desired) and an inlet of a typically bottom positioned secondary reservoir 102. A conduit 108 extends in a generally vertical ascending fashion between an outlet of the bottom positioned secondary reservoir 102 to an inlet of a generally upper positioned tertiary reservoir 104. A further conduit 110 extends from an outlet location of the tertiary reservoir 104 to a replenishment/refill inlet location associated with a top interior location of the primary fluid housing 76, above the water level 82, such that fluid is iteratively advanced from the secondary reservoir, to the tertiary reservoirs, and then re-deposited within the top interior of the main reservoir 76.

The arrangement of the reservoirs 76, 102 and 104 is further such that they employ known properties of fluid transfer physics for re-supplying to the primary reservoir fluid lost during bottom loading of buoyant cylinders. This generally includes an operational protocol in which, following an iterative draining of a subset volume of fluid from the main reservoir 76 (see outlet valve 112 in line 106 extending to inlet of the secondary reservoir 102, the tank or other fluid holding vessel associated with the secondary reservoir is re-pressurized, such as through the provision of an internal bladder, pump or other gas pressurization (not shown).

Following this, the physics principles of fluid flow dictate that fluid will travel from a region of greater pressure (e.g. the second reservoir 102), via outlet valve 114, to a communicable region of lesser pressure (e.g. inlet location 116 in line 108 to the tertiary reservoir 104) even when, in as this instance, the tertiary reservoir 104 is situated at an elevated location. Alternative to pressurizing the interior of the second reservoir 102, it is also envisioned that a vacuum created in the interior of the tertiary storage reservoir 104 can draw fluid from the lower positioned secondary reservoir 102.

It is additionally envisioned that the Venturi effect of fluid flow principles could be employed in a redesigning of the reduction in fluid pressure which results when a fluid flows through a constricted section of pipe. In this instance, the fluid velocity must increase through the constriction to satisfy the equation of continuity, while its pressure must decrease due to conservation of energy, the corresponding gain in kinetic energy balanced by a drop in pressure (or a pressure gradient force). The fluid thus contained within the tertiary reservoir 104 is thus at a sufficiently increased pressure that, upon being admitted through outlet valve 118, it is capable of flowing upward along line 110 to a redeposit location 120 associated with an above fill level interior of the main reservoir 76.

The arrangement and configuration of the various valves (such that the use of one way check or flow valves) is further such that undesirable back feed of water is avoided. The timing of the valves is further such that they open and close according to a predetermined and progressing protocol so that desired (and ascending) pressure levels are maintained within the second and tertiary reservoirs. It is also envisioned that a conventional pumping arrangement could be employed in combination with a single vertically ascending fluid conveying conduit for re-supplying directly to the top refill location fluid loss from the primary reservoir, the current illustration rather providing one desirable arrangement in which fluid mechanics substantially provides most or all of the lifting force of the fluid, thereby reducing or eliminating entirely the external power input required for effectuating fluid re-supply.

Figure 7:
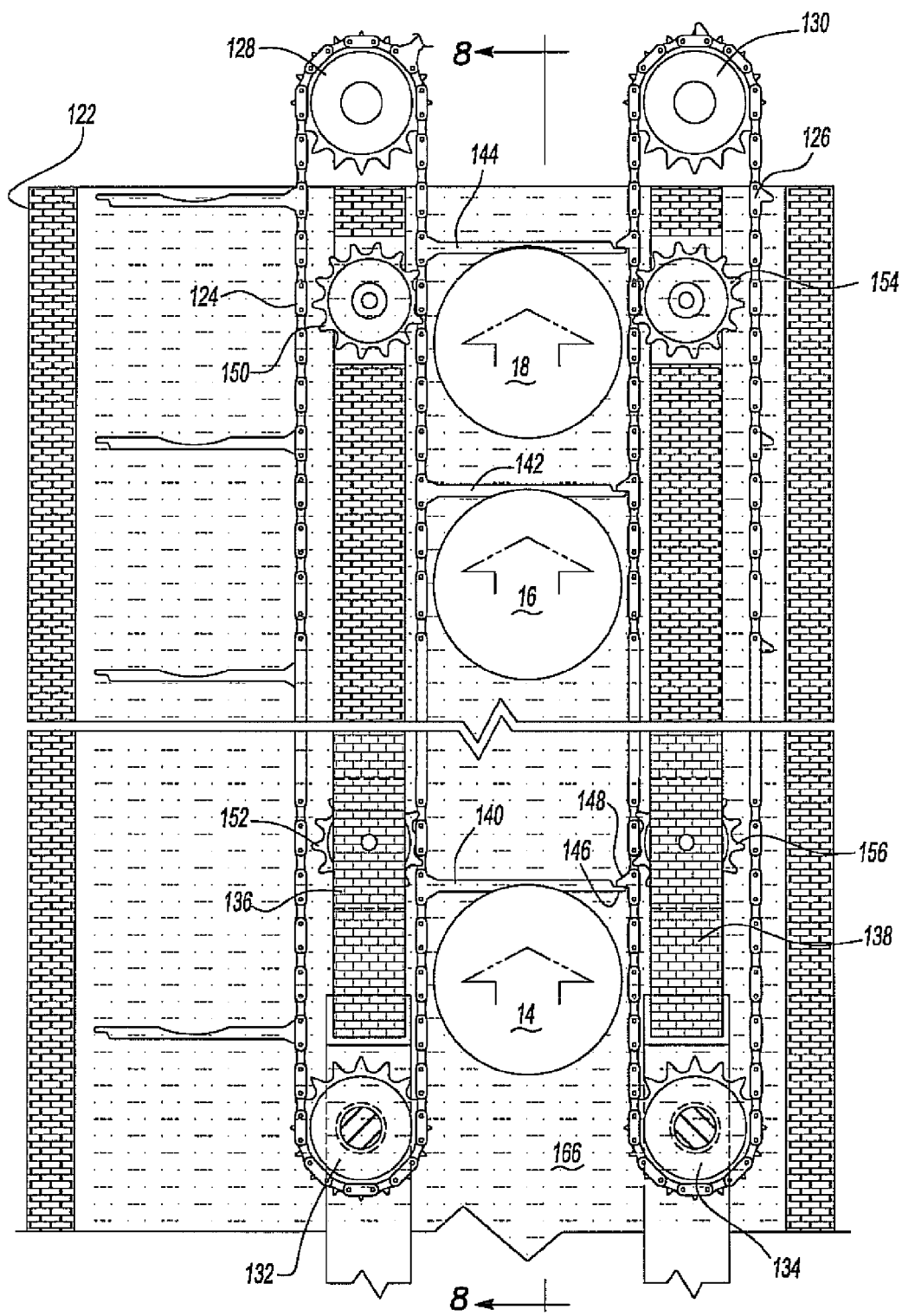
FIG. 7 is a side cutaway of an intermediate portion of a continuous work output assembly and illustrating multiple power take off components exhibiting exteriorly toothed gears incorporated into the supporting walls and which are engaged by the continuous chain drives in contact with the buoyant cylinders.

Referring now to FIG. 7, a side cutaway is shown in reduced length of an intermediate portion of a continuous work output assembly, see as including a housing 122. The arrangement of FIG. 7 is functionally similar to that previously described in detail in FIG. 2 with chain drives 124 and 126 supported by upper 128 & 130 and lower 132 & 134 gears for closed loop ascending/descending motion along spaced apart and vertically extending/passageway defining walls 136 and 138 within which is filled a fluid medium (e.g. water). Again shown at 140, 142, 144, et seq. are spaced apart paddles associated with the first chain drive 124 and which include configured outer ends (see at 146 associated with selected paddle 140) which are configured for abuttingly engaging an underside projection, at 148, associated with an opposing facing surface location of the second chain drive 126, these again absorbing the forces resulting from buoyant ascension of the cylinders 14, 16, 18 and passing the same onto the chain drives 124 and 126.

Figure 8:
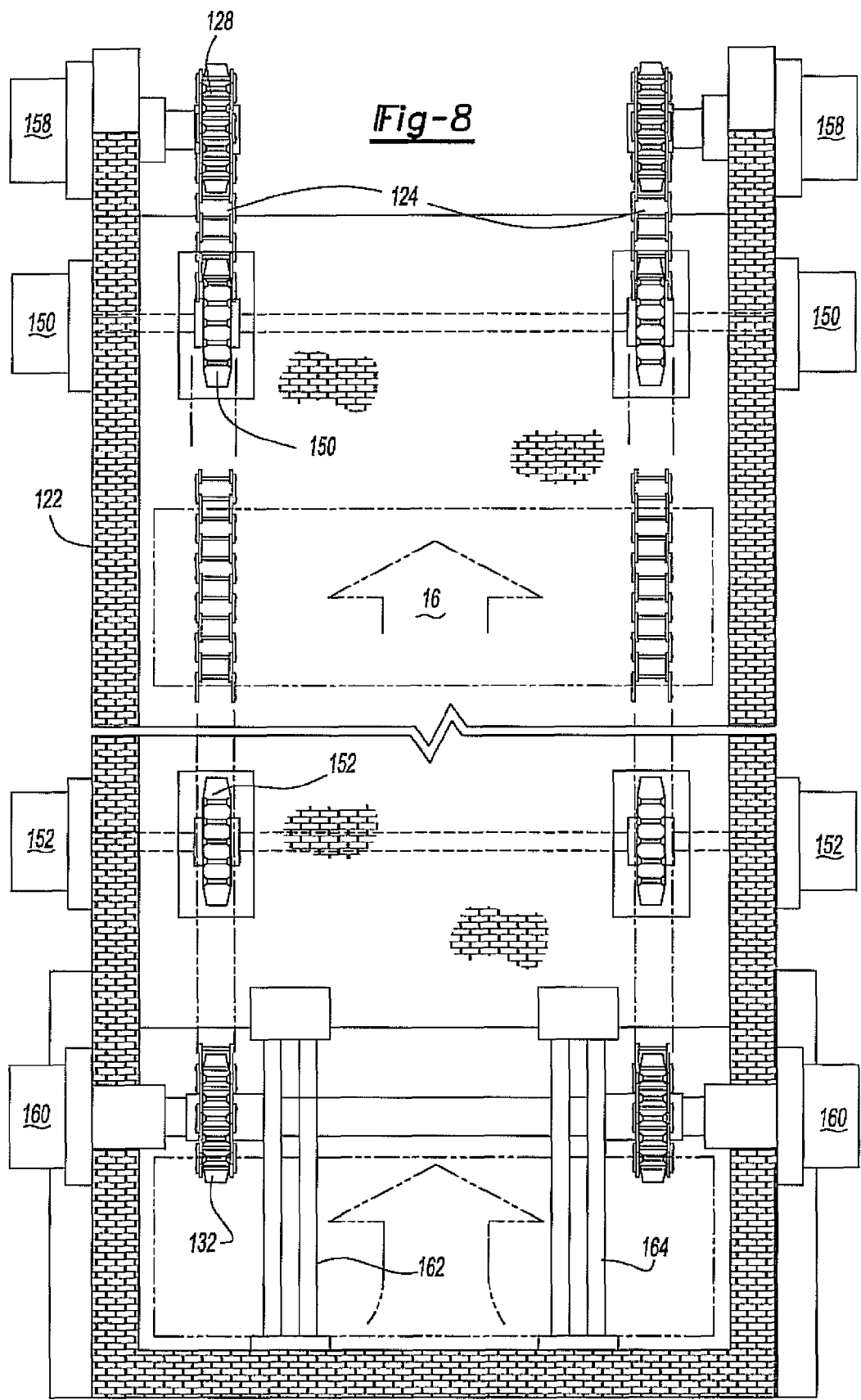
FIG. 8 is a cutaway view taken along line 8-8 of FIG. 7 and further illustrating in a widthwise extending fashion the configuration of the chain drives and associated power take off components.

As also shown in the height and width cutaway of FIG. 8, multiple power take off components, e.g. stationary and exteriorly toothed gears, are shown in upper and lower dedicated pairs, at 150 & 152 and 154 & 156, incorporated directly into the interior structure of each of the walls 136 and 138, and which are engaged by the continuous chain drives 124 and 126 in contact with the buoyant cylinders. Although not shown, it is envisioned and understood that appropriate power take off structure extends from the interiorly positioned locations shown and which can be either incorporated into the wall structure of the housing or communicated to intermediate side locations for distribution to a desired work output application.

FIG. 8 further illustrates additional power take off shaft locations, see at 158 and 160, these being extensions of the upper 128 and lower 132 chain drive supporting gears, as well as showing the width wise extending nature of the chain drives and power take off shafts, these including duplicate drive shafts located along an opposite end of the housing which is hidden in FIG. 7. Otherwise, the interior wall surfaces and support columns (see at 162 and 164 in FIG. 8) are configured in a similar fashion as previously illustrated and described in FIGS. 2 and 3 in order to provide adequate clearance of the cylinders being delivered into the lower end of the main reservoir, as well as the operation of the chain drives and associated paddles in cooperation with the defined passageway (at 166 in FIG. 7) through which ascends the buoyant cylinders.

Figure 9:
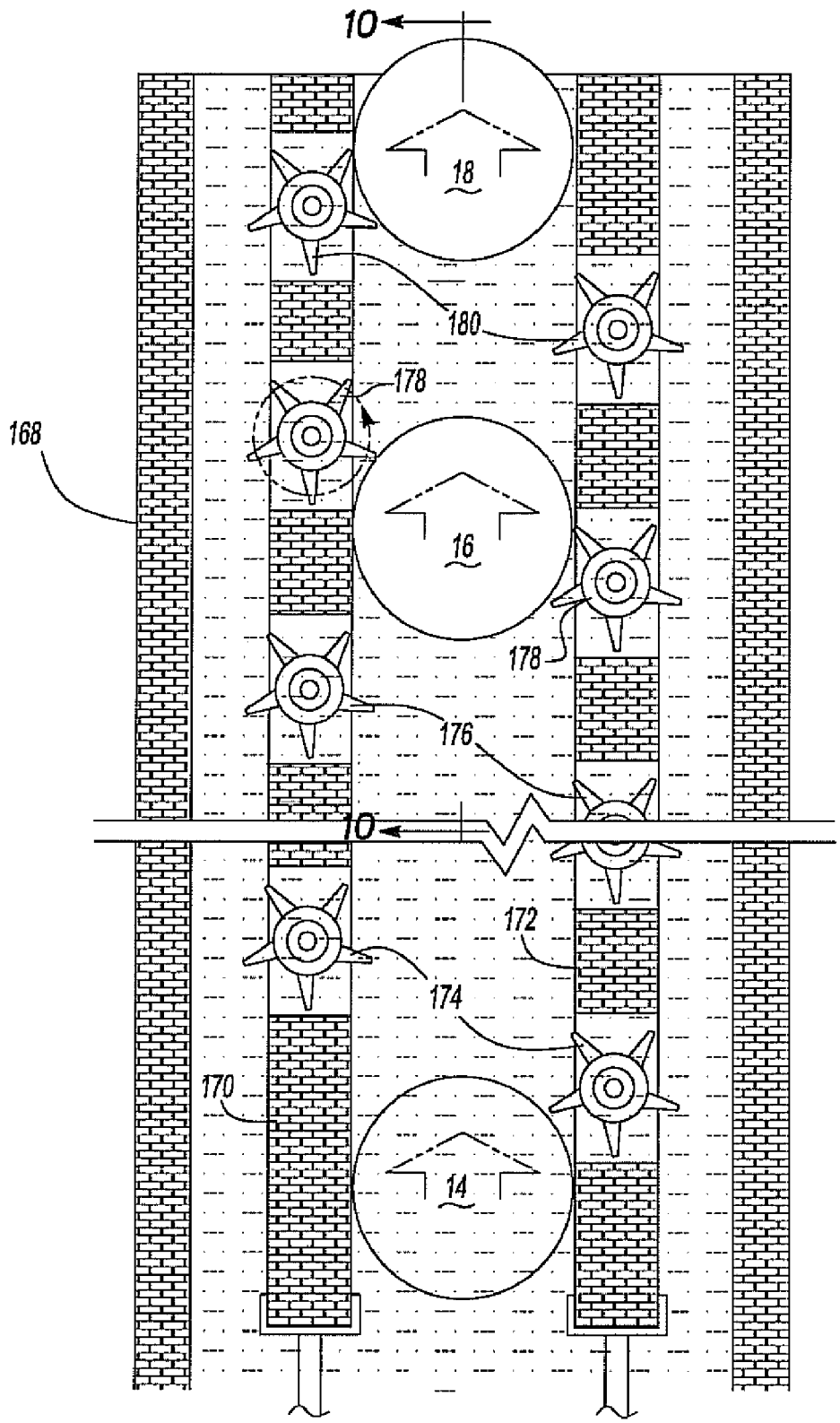
FIG. 9 is a side cutaway of an intermediate portion of a continuous work output assembly similar to that shown in FIG. 7 and illustrating a plurality of stationary positioned and rotatable power take off components resulting from buoyancy driven rise of cylinders restrained between closely dimensioned wall surfaces.
Figure 10:
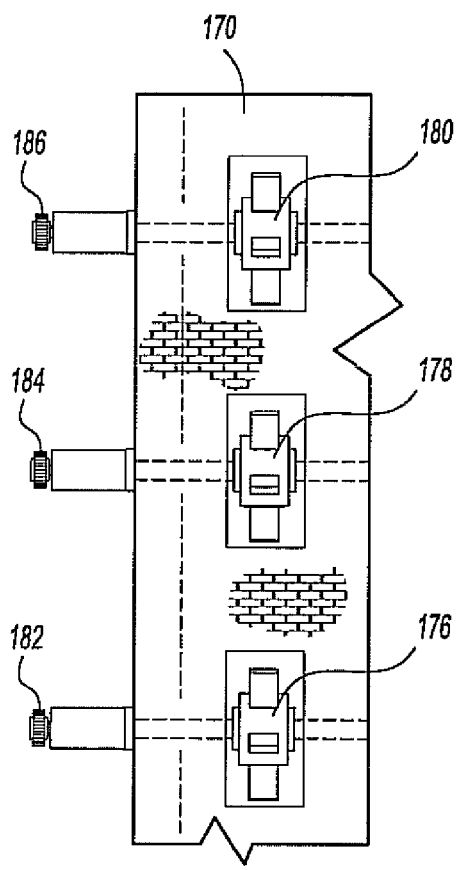
FIG. 10 is a cutaway view taken along line 10-10 of FIG. 9 and further illustrating in a widthwise extending fashion the configuration of the stationary power take off components.

FIG. 9 is a side cutaway of an intermediate portion of a continuous work output assembly, see housing 168, similar to that shown in FIG. 7, with the exception that redefined interior walls 170 and 172 incorporate a plurality of stationary positioned and rotatable power take off components, these shown at 174, 176, 178 and 180 in ascending fashion along each of the inner positioned and vertically extending/passageway defining walls 170 and 172. The components each exhibit a substantially star shape such that the arms associated with each component are contacted by successively ascending buoyancy cylinders, again at 14, 16 and 18, and are caused to rotate. As further shown in the widthwise cutaway of FIG. 10, output locations 182, 184 and 186 are provided for each of the stationary power take off locations 176, 178 and 180, and such as to which an input gear portion (not shown) of an external drive mechanism can be connected as contemplated.

Figure 11:
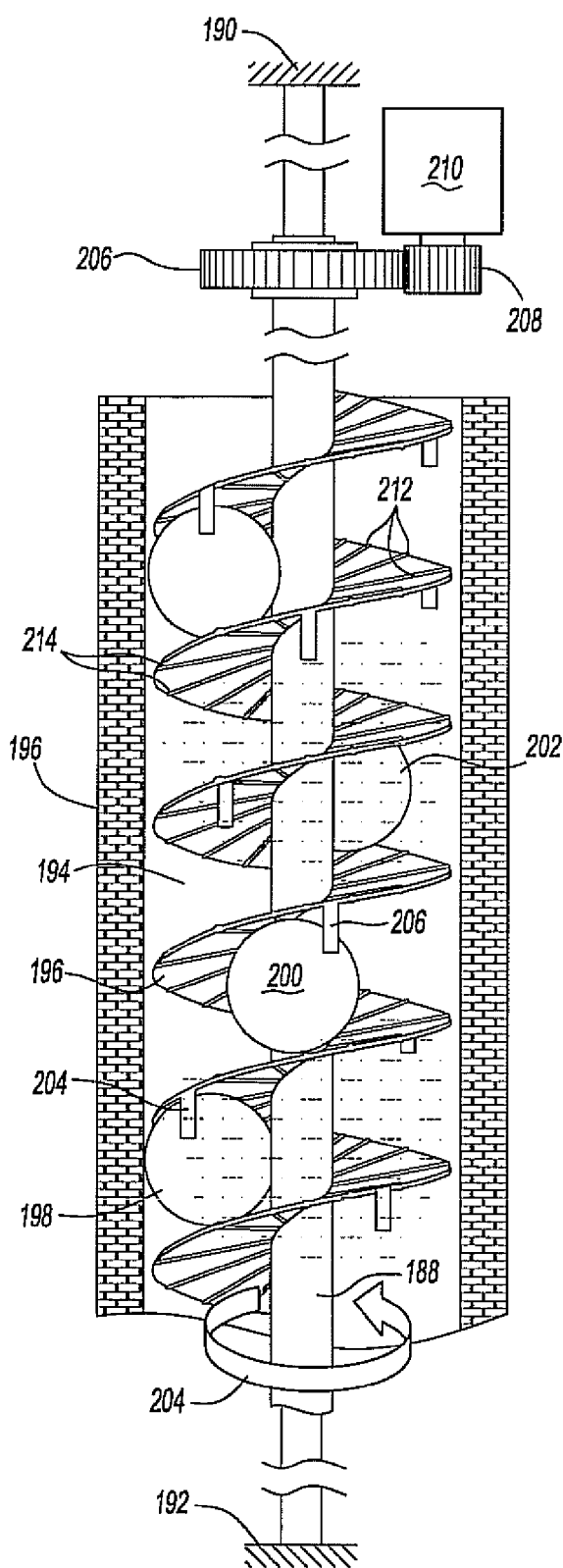
FIG. 11 a linear cutaway view of a continuous work output assembly and illustrating a height extending and rotatable screw in which successive spherical shaped buoyant components are engaged by downwardly projecting abutments located at circumferentially and ascending/descending locations associated with a continuous fluted portion associated with the drive screw.

Referring now to FIG. 11, a linear cutaway view is shown of a continuous work output assembly according to a yet further embodiment and illustrating a height extending and rotatable (drive) screw including a central shaft portion 188 supported at opposite ends 190 and 192 in rotatable supported fashion and so that the shaft 188 extends vertically through an interior and fluid filled passageway 194 defined by such as a housing 196. A generally fluted and spiral extending portion, see at 196, extends in winding fashion around and along the rotatably supported shaft 188 and such that each of a plurality of alternately configured buoyant inducing components (shown in this instance as spherically configured articles 198, 200, 202, et seq.) introduced into the reservoir interior are caused to contact selected abutment locations 204, 206, et seq., which extend from underside locations of the spiral winding fluted portion 196.

The upward buoyant forces exerted by the spherical articles 198, 200, 202 are absorbed by the fluted portion 196 which, given its configuration, converts a part of the vertically directed force to a horizontal rotating component force, this in turn causing the screw to rotate in selected direction 204 (see arrow). A coaxially mounted gear 206 associated with an upper extending end of the shaft 188 engages a succeeding gear 208 defining a part of the power take off assembly and which delivers the mechanical turning force to an external drive assembly representatively referenced at 210.

Either or both the top and bottom surfaces of the fluted (or vane) portions can further be grooved or otherwise notched, such as shown at 212 and 214, the purpose for which being to both provide additional or alternative gripping (or traction) of the individual buoyant containers (or floats) 198, 200, 202, as well as to provide a further radial fluid flow profile along the ascending flutes/vanes of the screw, this providing optimal and reduced drag rotation of the screw within the otherwise agitated fluid environment existing within the housing 194.

Additional related variants contemplate the vanes not being solid but including an apertured or grated appearance in order to facilitate, to the degree possible, fluid flow therethrough with attendant drag reduction. Associated bearings can also be designed to maximize, to the degree possible, the forces of friction exerted on the shaft 188 and in order to maximize the possible work output resulting from the converted tug motion exerted by the rising cylinders. It is further envisioned that an angle or pitch associated with the flutes/vanes can be modified to assist in controlling a degree and speed of float ascent and further in order to maximize a quantum of energy recovered from the rising floats. Additional considerations include providing the fixed or variable pitch screw in interconnected and replaceable sub-sections such as to facilitate ease of assembly/disassembly as well as maintenance.

Figure 12A:
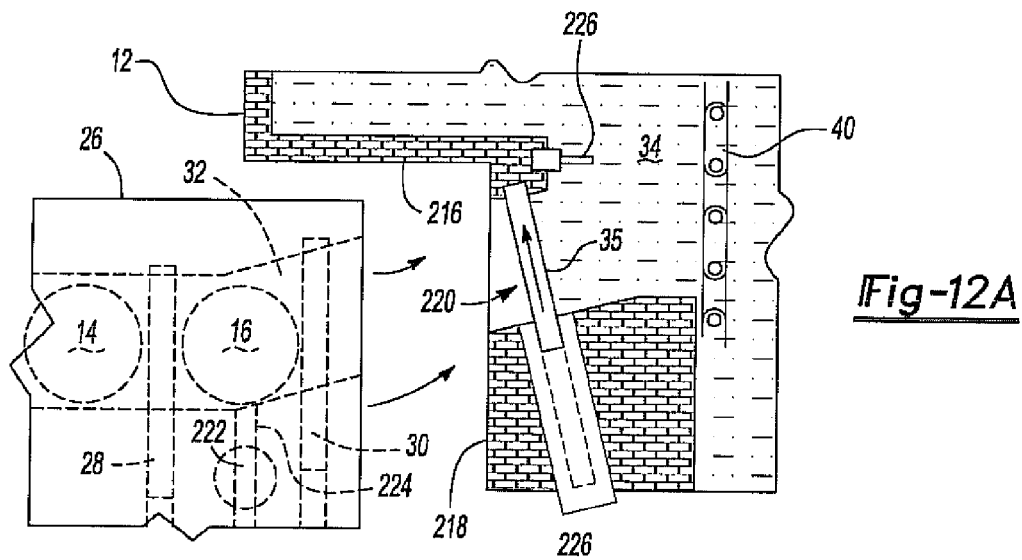
FIG. 12A is a first sectional cutaway of a bottom end reload mechanism and further illustrating, in partially exploded fashion a first multi gate removable component which is engageable with a second component incorporated into the fluid containing column.

Referring now to FIG. 12A, a first sectional cutaway is shown of the bottom end reload mechanism, as most broadly described at 26 in FIG. 2. For purpose of the description of FIGS. 12A-12F, common elements drawn from the description of FIG. 2 are repetitively numbered, with additional reference numerals being reserved for new features not previously described.

Referring again to FIG. 12A, the reload mechanism 26 is illustrated in partially exploded fashion, in which it operates as a removable component which is engageable with a second component, or receiving location (see angled top and side wall surfaces 216 and 218, within the wall 218 being defined a float entranceway 220 into the fluid containing column. The service gate 35, again incorporated into the inlet of the main housing 12, is illustrated in a closed position in order to permit removal (such as for service or repair) of the reload mechanism 26, and without causing losses from the fluid reservoir contained within the main housing.

Although not shown, it is further understood that each of the gate mechanisms, in particular those shown at 28 and 30 incorporated into the reload mechanism 26 and, to a lesser extent, the service gate shown at 35, can adopt any desired configuration and shape such as which is consistent with the ability to provide an adequate degree of fluid sealing characteristics when closed and which can be quickly and repetitively opened in order to allow for the sequential operating protocol to be descried in reference to each of FIGS. 12B-12F. Along these lines, the gates can also be provided as fluid tight doors exhibiting first and second displaceable halves, opposing and inner facing surfaces of which including seals (not shown) which further exhibiting rubberized or otherwise fluid-tight and deformable properties which prevents excessive fluid loss when engaged yet provides acceptable performance characteristics.

Such seals can include replaceable rubberized/composite surfaces or tread-like designs and can further exhibit mating teethed patterns in which a selected seal is oversized to force a sealing engagement with a likewise mating and undersized receiving location (or pocket) associated with an opposing door portion, this creating additional pressure sealing forces upon closing the doors in an inward/opposing fashion. Additional sealing, mounting, reinforcing and actuating structures can also be incorporated into the design and arrangement of surface located seals associated with either a full sized door or opposing half-sized and inter-displaceable doors. These can further include provision of recessed fasteners embedded into the door construction for holding the seals in place. Metal and/or composite constructed plates can be in-molded into the seal that the fasteners pass through to preserve their integrity, with each seal further capable of extending a partial or total length of fluid door sealing surface. The doors are further envisioned to be designed for retraction only to the degree necessary to allow for seal maintenance and replacement on an as-needed basis.

Figure 12B:
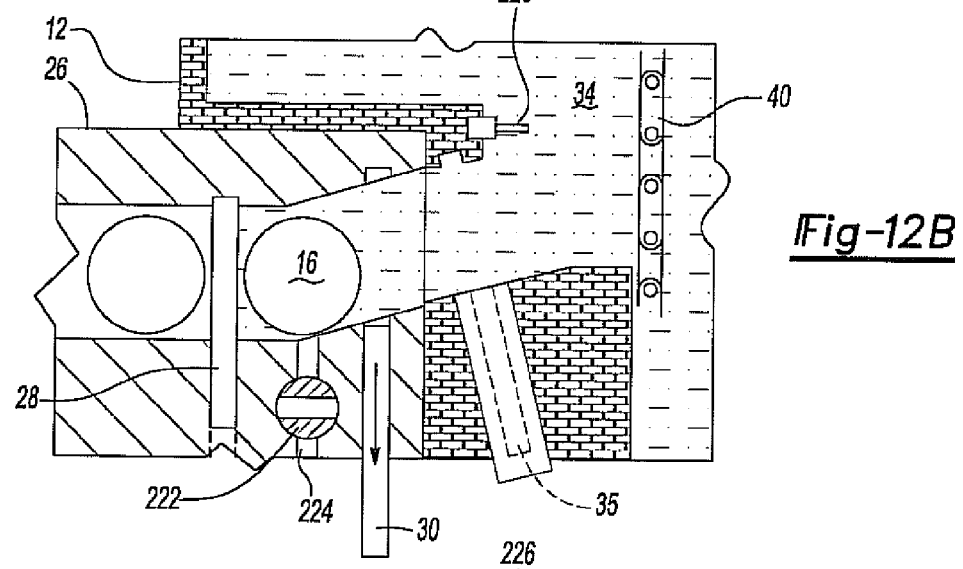
FIG. 12B is a successive and assembled view illustrating an initial loading position in which a cylinder is advanced into a chamber defined between first and second gates and, following closure of the gate and subsequently flooding, the second gate is retracted.

Referring to each of the succeeding views of FIGS. 12A-12F, the reload mechanism 26, illustrated in phantom in FIG. 12A, also includes a check valve 222 positioned along a gravity drain passageway 224 defined in the compartment 32 defined between the first and second gates 28 and 30. FIG. 12B is a successive and assembled view in which the reload mechanism 26 is secured to the inlet location of the main housing 12 and the service door 35 retracted. At this point, the reload mechanism is illustrated in an initial loading position in which selected cylinder 16 is advanced into the chamber 32 defined between the first 28 and second 30 gates, the first gate 28 subsequently being closed along with the second (typically pre-closed) gate 30 and prior to an appropriate fluid conveying mechanism (not shown) being activated in order to flood the compartment within which the cylinder 16 is held. Following this, the second gate 30 is retracted as shown and so that the previously contained cylinder 16 is now permitted to enter the main housing through the entranceway 220 which communicates with the vertical passageway 34.

Figure 12C:
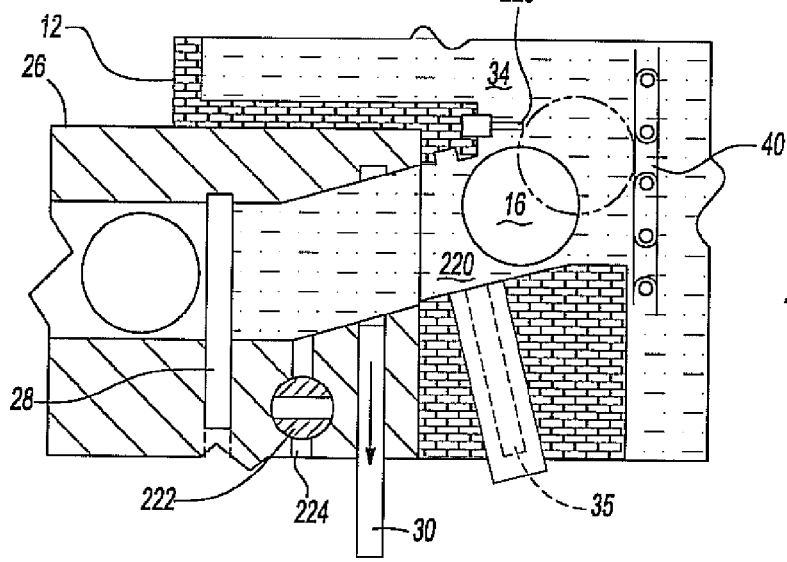
FIG. 12C is a succeeding view to FIG. 12B and showing the buoyant cylinder transferring through an adjoining entranceway location communicating the reload mechanism with the vertically extending chain drives and further showing a synchronized restraining member located in extending fashion relative to a base wall for temporarily arresting upward movement of the cylinders along with the chain drives.

Referring to FIG. 12C, a succeeding view to FIG. 12B shows the buoyant cylinder 16 transferring through the adjoining entranceway location 220 communicating the reload mechanism 26 with the vertically extending chain drives (as previously described and representatively shown by portion 40 of first chain drive) associated with the vertical ascending passageway 34. A synchronized restraining member 226 (see also FIG. 2) is located in extending fashion relative to an interior base wall location defining a boundary between the entranceway 220 and upward passageway 34 and which includes such as a retractable portion for temporarily arresting upward movement of each sequentially introduced cylinder (again at 16) along with the chain drives.

Figure 12D:
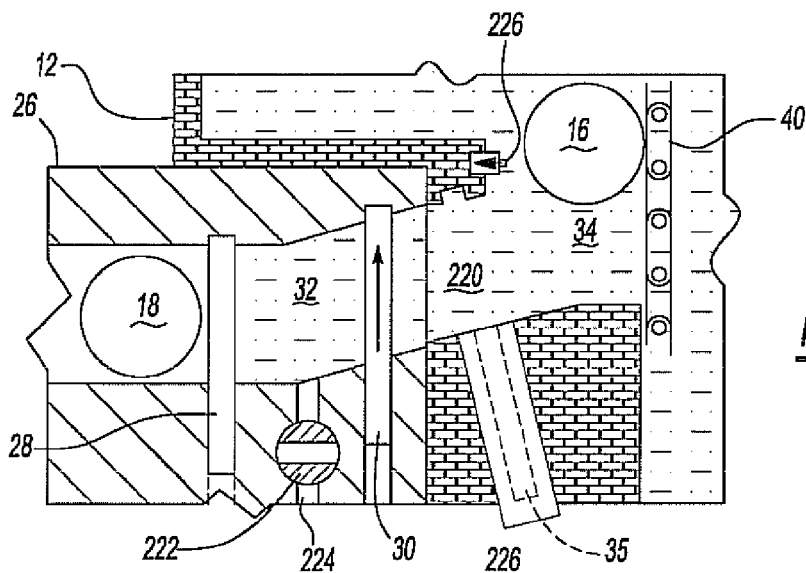
FIG. 12D is a succeeding view to FIG. 12C and showing the second gate being closed concurrent with the restraining member retracted to release the previously restrained buoyant cylinder for subsequent work output generating drive motion exerted upon the chains.
Figure 12E:
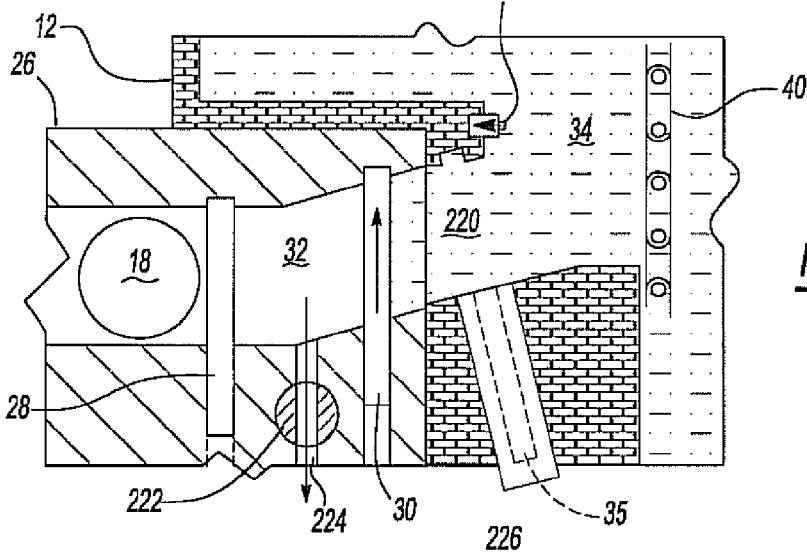
FIG. 12E is a further succeeding view illustrating the opening of a gravity fluid discharge ball valve located in the chamber defined between the first and second closed gates and in order drain fluid from the chamber prior to loading of a succeeding cylinder.

FIG. 12D is a succeeding view to FIG. 12C and shows the second gate 30 being closed concurrent with the restraining member 226 retracted to release the previously restrained buoyant cylinder 16 for subsequent ascension along the passageway 34 defined between the inner spaced walls (again at 36 and 38 in reference to FIG. 2) and associated work output generating drive motion exerted upon the chain drives 40 and 42. FIG. 12E is a further succeeding view illustrating the opening of a gravity fluid discharge ball valve 222, again located in the chamber 32 defined between the first 28 and second 30 closed gates, this in order drain fluid from the chamber prior to loading of a succeeding cylinder 18.

Figure 12F:
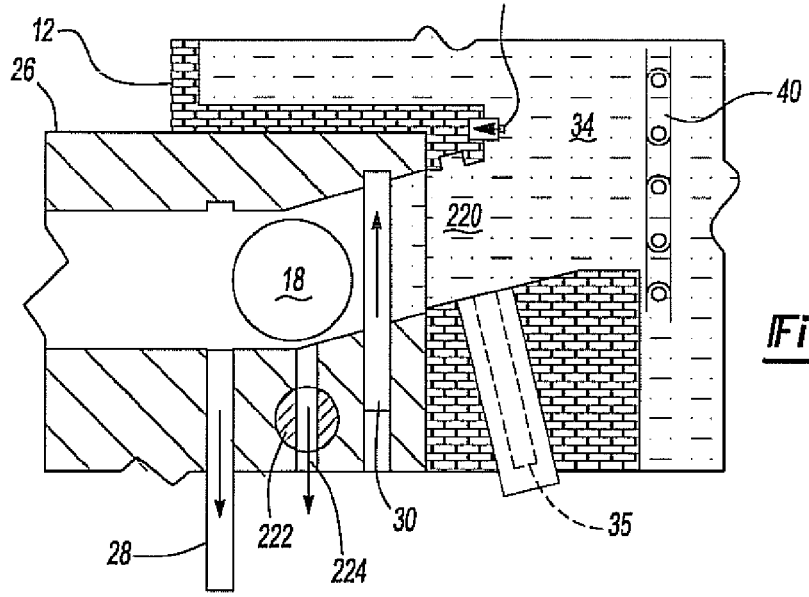
FIG. 12F is a succeeding view to FIG. 12E, as well as a preceding view to FIG. 12B, and showing the retraction of the first gate and subsequent loading a succeeding cylinder, following which the discharge valve is closed and the chamber flooded.

Referring again to the previous discussion of FIG. 6, the fluid drain line 224 generally corresponds to the line identified at 106 (either forming a part of this line or being connected to it) and in order to communicate the fluid with the secondary storage reservoir 102 for subsequent transfer to the tertiary storage reservoir 104 and then to top refill/redelivery to the main reservoir 76 in the fashion previously described. Referring to FIG. 12F, which is a succeeding view to FIG. 12E as well as a preceding view to FIG. 12B, the first gate 28 is again retracted for subsequent loading of the succeeding cylinder 1S, following which the discharge valve 222 is closed and the chamber 32 flooded.

Referring now to FIG. 13A is a first sectional cutaway of a bottom end reload mechanism according to an alternate variant to that collectively referenced in FIGS. 12A-12F and which is generally incorporated into a reservoir containing housing 228. A generally cylindrical shaped and continuous rotating member 230 is supported in substantially sealing fashion relative to an entranceway location 232 associated with the fluid filled column 228. The rotating member 230 exhibits a three dimensional channel recess 234 within which is received an initial buoyant cylinder 14 in a first loading position. As further shown, the rotating member 230 seats within a finely dimensioned cavity or pocket (see inner walls 236 and 238 shown in cutaway) which encircles the outer surface of the rotating member 230 (such as which may include a rubberized or other fluid impervious material) and which permits operation of the assembly with a minimum of flow loss.

FIG. 13B is a succeeding illustration to FIG. 13A and showing the cylindrical shaped member 230 rotated to a position in which the cylinder receiving recess 234 is aligned with an entranceway location 240 for releasing the cylinder 14 for elevation into an adjoining vertical passageway 242 in communication with the entranceway 240 and for operable exertion of a chain drive 244 in a fashion such as previously described. As further shown in FIG. 13C, the cylindrical member is rotated to a further position in which the fluid retaining recess 234 is positioned in a downward and aligned fashion with a bottom extending passageway 246 for permitting gravity discharge of a remaining minor volume of fluid from the recess 234 (such as again for re-supply according to the teachings of FIG. 6) and prior to the rotating member 230 returning to the reloading configuration of FIG. 13A. A reload conveyor 248 is representatively shown in each of FIGS. 13A and 13B, it being understood that any suitable reload configuration is employable for successively and iteratively delivering additional cylinders 16 within the recess 234 for subsequent introduction within the fluid filled column.

Referring now to FIG. 14, a lengthwise cutaway illustration is generally shown at 250 of a variable angle rise chamber associated with a continuous work output assembly according to a further embodiment and illustrating one or more work output chain drives, see at 252 and 254 and which can be integrated into individual or end to end connected sections for maintenance considerations and which further extend along opposite wall surfaces associated with a reciprocating, serpentine and ascending fluid filled passageway 256 in order to maximize energy recovery from a plurality of cylinders 14, 16, 18, et seq. which travel along and upwardly within the interior passageway 256 and contact rotatable paddle wheels 258, 260, 262 et seq., these being stationary and rotatably mounted and in turn being operably engaged to the chain drives 252 and 254 in order to continuously advance the same. Additional single paddles 264 exhibit fixed return positions to prevent a selected cylinder/float from becoming caught within the passageway and which can also assist in timing the position and rate of advance of each buoyant cylinder. Additional features include the provision of separate, such as externally secured, gears 266, 268, 270 et seq., and which assist in the suspension or structural supporting of the drive chains 252 and 254 at the indicated locations.

Design consideration include the sizing of the channel being large enough to prevent a fluid wall in front of a selected float from causing impediment during rise, and unless otherwise designed in order to achieve desired speed and rate of rise. The size and shape of the buoyant cylinders is further such that energy recovery is maximized.

Referring to FIG. 15, is an illustration is shown in perspective at 270 of a buoyant drive cylinder according to one non-limiting embodiment of the present inventions. Referring further to each of FIGS. 15A-15H, a series of potential cutaway illustrations, successively shown at 274-288, are illustrated of the drive cylinder of FIG. 15 and which by design vary its buoyancy characteristics. Specifically, FIG. 15A illustrates a first substantially closed interior which can define lesser buoyant properties. Succeeding interiors 276 (FIG. 15B) and 278 (FIG. 15C) define interior cavities which establish greater buoyancy but, in the case of that shown in FIG. 15C, can be eccentrically defined relative to a cross sectional center point of the cylinder interior in order to influence the ascending travel characteristics of the cylinder within a column of fluid. Further patterns including the spoke arrangement 280 (FIG. 15D) and the multi-apertured pattern 282 in FIG. 15E establish further varied buoyancy characteristics. Succeeding patterns 284 (FIG. 15F) and 286 (FIG. 15G) are likewise eccentrically designed and that shown in FIG. 15G further exhibiting an overall oval or elliptical shape to the affect the travel characteristics of the cylinder. Finally, the cutaway design of FIG. 15H illustrates a generally coaxially defined hollow interior 288 combined with a plurality of circumferentially spaced protuberances 290 which affect the gripping aspects of the cylinder while traveling along a fluid-filled passageway.

FIG. 16 is an illustration of a modified buoyant drive cylinder 293 according to a farther non-limiting embodiment and which illustrates opposite end extending and reduced diameter trunnion portions 292 and 2947 such as which can be incorporated into an appropriately designed loading station which can include associated advancing structure for grasping or otherwise influencing the cylinder 293 via its end disposed trunnion portions 292 and 294. Finally, FIG. 17 is an illustration of a generally three dimensional buoyant drive mechanism 296 according to a further non-limiting embodiment and which is generally illustrated as a three dimensional and rectangular configured buoyant article.

As previously explained, the individual floats/cylinders can vary in sized depending upon the parameters associated with the conveyors 12 and 14, and in some instances can exhibit any three dimensional size, shape or configuration. The composition of each float can also include such as a hollow aluminum, outer solid and inner honey comb plastic design, or the like and in order to achieve the desired features of strength and durability in use. Additional applications contemplate the buoyancy driven mechanisms operating as a secondary (or backup) low speed drive system during low speed travel and/or off peak demand cycles associated with an appropriately configured land/sea vehicle, and such as which can also include a conventional propulsion system of some other type in addition to that disclosed and described herein.

Having described my invention, other and additional preferred embodiments will become apparent to those skilled in the art to which it pertains, and without deviating from the scope of the appended claims:

I claim:

1. A mechanical output generating assembly, comprising:
    a housing having a fluid filled interior and defining an ascending passageway through which travels a buoyant article;
    first and second chain drives incorporated into said housing and defining, there between, said passageway;
    a reload mechanism for successively introducing a plurality of buoyant article into a bottom feed location associated with said housing, said buoyant articles exerting a lift generating force to drive a power take off component incorporated into said housing;
    said reload mechanism defining a secondary and separately attachable housing engageable over an entranceway associated with said bottom feed location, said bottom feed location of said housing further comprising a service door comprising a part of said housing and which closes off said entranceway to said ascending passageway upon disengagement said reload mechanism; and
    a re-supply mechanism for transferring buoyant articles from an upper exit location of said housing to said reload mechanism.

2. The assembly as described in claim 1, said chain drives securing to upper and lower spaced apart gears in closed loop fashion, said first chain drive further comprising a plurality of paddles which, upon advancing to an ascending location within said passageway, contacts a location associated with said second chain drive to conjoin said chain drives and so that an underside of said paddle is exerted by a selected buoyant article.

3. The assembly as described in claim 2, further comprising at least one power take off shaft connected to at least one of said chain drive and supporting gears.

4. The assembly as described in claim 1, further comprising at least one stationary and rotating power take off shaft incorporated into said housing in communication with said buoyant articles ascending through said passageway.

5. The assembly as described in claim 1, further comprising a vertically extending screw including a central shaft supported in rotatable fashion within said passageway, a fluted and spiraling vane extending from said shaft and establishing underside abutments for receiving and restraining a plurality of buoyant articles during successive rotation.

6. The assembly as described in claim 1, said reload mechanism further comprising a first gate and a second gate defining there between a compartment, a check valve being positioned along a gravity drain passageway extending from said compartment.

7. The assembly as described in claim 1, a fluid drain extending from said reload mechanism and in combination with separate secondary and tertiary fluid holding reservoirs, defining a fluid re-supply system for rerouting fluid lost at said reload mechanism for eventual top refill within said housing interior.

8. A mechanical output generating assembly, comprising:
    a housing having a fluid filled interior and defining an ascending passageway through which travels a buoyant article;
    a reload mechanism for successively introducing a plurality of buoyant article into a bottom feed location associated with said housing, said buoyant articles exerting a lift generating force to drive a power take off component incorporated into said housing;
    said reload mechanism further comprising a generally cylindrical shaped and continuous rotating member incorporated into said bottom feed location of said housing and which is supported in substantially sealing fashion relative to an entranceway location, said rotating member exhibiting a three dimensional channel recess within which is received said buoyant article which rotates from a first position associated with said bottom feed location, to a second location in which said buoyant article is released to said entranceway location, and to a third location in which said recess is aligned with a drain line for removal of remaining fluid retained within said recess; and
    a re-supply mechanism for transferring buoyant articles from an upper exit location of said housing to said reload mechanism.

9. A mechanical output generating assembly, comprising:
    a housing having a fluid filled interior and defining an ascending passageway through which travels a buoyant article;
    a reload mechanism for successively introducing a plurality of buoyant article into a bottom feed location associated with said housing, said buoyant articles exerting a lift generating force to drive a power take off component incorporated into said housing;
    said reload mechanism defining a secondary and separately attachable housing engageable over an entranceway associated with said bottom feed location, said reload mechanism further comprising a first gate and a second gate defining there between a compartment, a check valve being positioned along a gravity drain passageway extending from said compartment and allowing for iterative flooding and draining of said compartment concurrent with successive admittance of said buoyant articles into said compartment and subsequent discharge into said ascending passageway; and a re-supply mechanism for transferring buoyant articles from an upper exit location of said housing to said reload mechanism.

10. The assembly as described in claim 9, further comprising a synchronized restraining member located in extending fashion relative to an interior of said housing proximate a boundary between said entranceway and upward passageway, said restraining member including a retractable portion for temporarily arresting upward movement of each sequentially introduced buoyant article.

11. A mechanical output generating assembly, comprising:

a housing having a fluid filled interior and defining an ascending passageway through which travels a buoyant article;

a reload mechanism for successively introducing a plurality of buoyant article into a bottom feed location associated with said housing, said buoyant articles exerting a lift generating force to drive a power take off component incorporated into said housing;

said reload mechanism defining a secondary and separately attachable housing engageable over an entranceway associated with said bottom feed location, said bottom feed location of said housing further comprising a service door comprising a part of said housing and which closes off said entranceway to said ascending passageway upon disengagement said reload mechanism;

said reload mechanism further comprising a first gate and a second gate defining there between a compartment, a check valve being positioned along a gravity drain passageway extending from said compartment; and a re-supply mechanism for transferring buoyant articles from an upper exit location of said housing to said reload mechanism.

* * * * *